(12) United States Patent
Planck et al.

(10) Patent No.: US 9,032,518 B2
(45) Date of Patent: May 12, 2015

(54) INTERNET MONITORING AND ALERTING SYSTEM

(71) Applicants: Max Wilhelm Planck, Socorro, NM (US); Richard David Colbaugh, Santa Fe, NM (US); Kristin Lea Glass, Santa Fe, NM (US); Gerald Neal Willard, Severn, MD (US); Michelle Denise Thiess, Linthicum, MD (US); Darryl Mackinnon Ackley, Albuquerque, NM (US); Isis Rose Pollard, Albuquerque, NM (US); Jason Paul Mattax, Socorro, NM (US); Brandon Michael Barber, Herndon, VA (US); Noah Michael Shepard, Albuquerque, NM (US)

(72) Inventors: Max Wilhelm Planck, Socorro, NM (US); Richard David Colbaugh, Santa Fe, NM (US); Kristin Lea Glass, Santa Fe, NM (US); Gerald Neal Willard, Severn, MD (US); Michelle Denise Thiess, Linthicum, MD (US); Darryl Mackinnon Ackley, Albuquerque, NM (US); Isis Rose Pollard, Albuquerque, NM (US); Jason Paul Mattax, Socorro, NM (US); Brandon Michael Barber, Herndon, VA (US); Noah Michael Shepard, Albuquerque, NM (US)

(73) Assignee: New Mexico Technical Research Foundation, Socorro, NM (US)

( * ) Notice: Subject to any disclaimer, the term of this patent is extended or adjusted under 35 U.S.C. 154(b) by 0 days.

(21) Appl. No.: 13/654,276

(22) Filed: Oct. 17, 2012

(65) Prior Publication Data
US 2013/0326616 A1 Dec. 5, 2013

Related U.S. Application Data

(60) Provisional application No. 61/547,861, filed on Oct. 17, 2011.

(51) Int. Cl.
*G06F 11/00* (2006.01)
*H04L 29/06* (2006.01)

(52) U.S. Cl.
CPC ................................ *H04L 63/1416* (2013.01)

(58) Field of Classification Search
USPC ............................................ 726/22; 713/201
See application file for complete search history.

(56) References Cited

U.S. PATENT DOCUMENTS

| | | | | |
|---|---|---|---|---|
| 2002/0069369 | A1* | 6/2002 | Tremain | 713/201 |
| 2003/0126468 | A1* | 7/2003 | Markham | 713/201 |

* cited by examiner

*Primary Examiner* — Teshome Hailu
*Assistant Examiner* — Abiy Getachew
(74) *Attorney, Agent, or Firm* — Jennifer S. Stachniak; Robert W. Becker

(57) ABSTRACT

A monitoring and alerting system for detecting a disruptive event on the Internet includes a data collection and wrapping module configured to process input data that includes messages produced by a network routing protocol, including a live stream of messages on the network, historical dumps of the message to a computer's file system, or both. An automated analysis engine includes analysis modules configured to analyze routing information and selected Internet behaviors from the input data. User output includes automated alerts to the user and an interactive analysis module. The analysis modules include a probabilistic origin hijack analysis module; a probabilistic route hijack analysis module; a Hidden Markov Model analysis module; a tensor decomposition and analysis module and a static topology analysis module; and a dynamic topology analysis module.

16 Claims, 3 Drawing Sheets

INTERNET MONITORING AND ALERTING SYSTEM

The instant application should be granted the priority date of Oct. 17, 2011, the filing date of the corresponding provisional application Ser. No. 61/547,861.

BACKGROUND OF THE INVENTION

The present invention relates to an automated Internet Monitoring and Alerting System that produces alerts for situational awareness purposes.

More specifically, the invention relates to an Internet Monitoring and Alerting System that provides analytic capabilities for the Internet as a complete system by utilizing the information found in routing message streams such as those from Border Gateway Protocol (BGP).

BGP message streams provide details about how information is routed across the Internet for specific Internet Protocol (IP) address ranges. Other message streams also provide this detail, including Open Shortest Path First (OSPF). These message streams are utilized by converting the messages into a common internal format.

The individual analytic components fall into two basic categories: those that characterize behaviors of protocols and those that exploit specifics of protocols. In the case of BGP, the protocol-specific analytics are hijacked prefix and hijacked route detection, and the behaviors based analytics are Hidden Markov Models (HMM), Tensor Decomposition, and Graph-based topology analysis (both static and dynamic analyses).

SUMMARY OF THE INVENTION

With the near real-time automated operational set of technologies utilized in the system according to the present application, the dynamics of the global Internet are monitored. The monitoring provides characterization of Internet dynamics in the following forms:

Disruptive event detection: detection of abnormal dynamics that lead to disruption of normal operation of the entire Internet or any part thereof Disruptive event classification: the application of a high-level label placing a detected event into an event taxonomy, and Disruptive event location: identification of the logical and geographic region(s) participating in the event.

The automated monitoring system produces alerts containing information pertaining to disruptions, such as the event time, classification, and location.

Alerts are distributed via electronic mail (email) or as Really Simple Syndication (RSS) feeds. The input data to the automated monitoring system is messages from any routing protocol that changes routes in a discrete manner. The operating scale of the routing protocol drives the scale of the monitor.

In any routing protocol, there are destinations. In the case of the Internet, these destinations are known as prefixes. Each prefix used in the Internet is assigned to a given organization or individual; this is known as the originator of the prefix. In Hijacked Prefix Detection, historic information is used to calculate the probability that any node in the Internet is the originator for each known prefix. This probability is then used to indicate the likelihood that an observed originator claim in the incoming data is valid.

The basis of Hijacked Route Detection analysis is similar to Hijacked Prefix Detection with the distinction being that rather than being concerned with just the destination of a given route, the entire route is included in the analysis. The probabilities for each pair of nodes being seen in a route are calculated from historic information. These probabilities lead to a calculation of the likelihood that a given hop in incoming data is normal.

While Hidden Markov Models are known as a statistical modeling mechanism, the application to timeseries information extracted from discrete routing protocols is unique to the present invention. The Internet Monitoring and Alerting System according to the present invention uses HMMs as a means to probabilistically understand the state space the internet is moving through and to detect when the system transitions into states that represent abnormal dynamics. In addition, HMMs are used to classify a given sequence of state transitions as being probabilistically related to a given group of trajectories.

While many different tensor decomposition and higher-order singular value decomposition methods exist and are well-known, the application of PARAFAC-CANDECOMP decomposition to routing dynamics is unique to the present invention. Tensor decomposition provides two major pieces of information when applied to routing data: significant origins of routes and significant destinations of routes. Tensor decomposition provides the two end points in a topology of routes experiencing change. These end points in the topology then drive the topology analysis components.

Because the system according to the present invention runs off of data designed to deal with the topology of the Internet, it has access to a rich set of topology data. This topology is mathematically represented as a graph with the addition of semantic information for each node and edge. There are two kinds of graph-based analytics used to accomplish the topology analysis: static analysis and dynamic analysis.

Static analysis is accomplished by the application of several graph metrics to a topology snapshot at any given point in time. These metrics range from traditional Dijkstra, to the more modern Hubs and Authorities, and K-Shell algorithms. Some of the metrics used were designed for computer network analysis, and some are adapted to computer network analysts from graph analysis used in other fields.

Dynamic analysis is accomplished by building change graphs, where the addition or removal of nodes and edges through time are tracked, and a graph is constructed wherein node and edge semantics indicate change in topology through time. These graph dynamics and the resulting analytic metrics (which are adapted from static analysis or developed specifically for dynamic analysis) are unique to the present invention.

The present invention includes several visualizations that allow for human interaction with the data. These include methods for displaying several dimensions of analytic results simultaneously, allowing targeted human understanding of the topology changes within the Internet. For example, according to the present invention, Internet topology situational awareness visualizations provide the following information about routing nodes:

Geographic and logical location,

The impact of disruptive events, and

Their importance to Internet routing.

All of these additional visualizations and data interaction mechanisms are available through a web-based portal.

In addition to the information available through the portal, alerts are automatically generated and distributed through email. These alerts contain information regarding:

The severity of the disruptive event,

The model-fit metrics for each event-type-labeled model,

Logical localization information for each entity involved in the event,

Metrics to rank involved entities based on associated topological community, and Links to relevant portal analysis pages that detail the event.

Alert information also is available as a RSS feed, but contains the same information as the email content discussed above.

It is an objective of the present invention to provide an Internet Monitoring and Alerting System as a mechanism to reliably monitor the dynamics of the Internet by maintaining a near real-time automated operational set of technologies.

BRIEF DESCRIPTION OF THE DRAWINGS

This and other objects and advantages of the present application will be described in detail in the following specification in conjunction with the accompanying schematic drawings, in which.

DETAILED DESCRIPTION OF THE PREFERRED EMBODIMENTS

Figure 1:
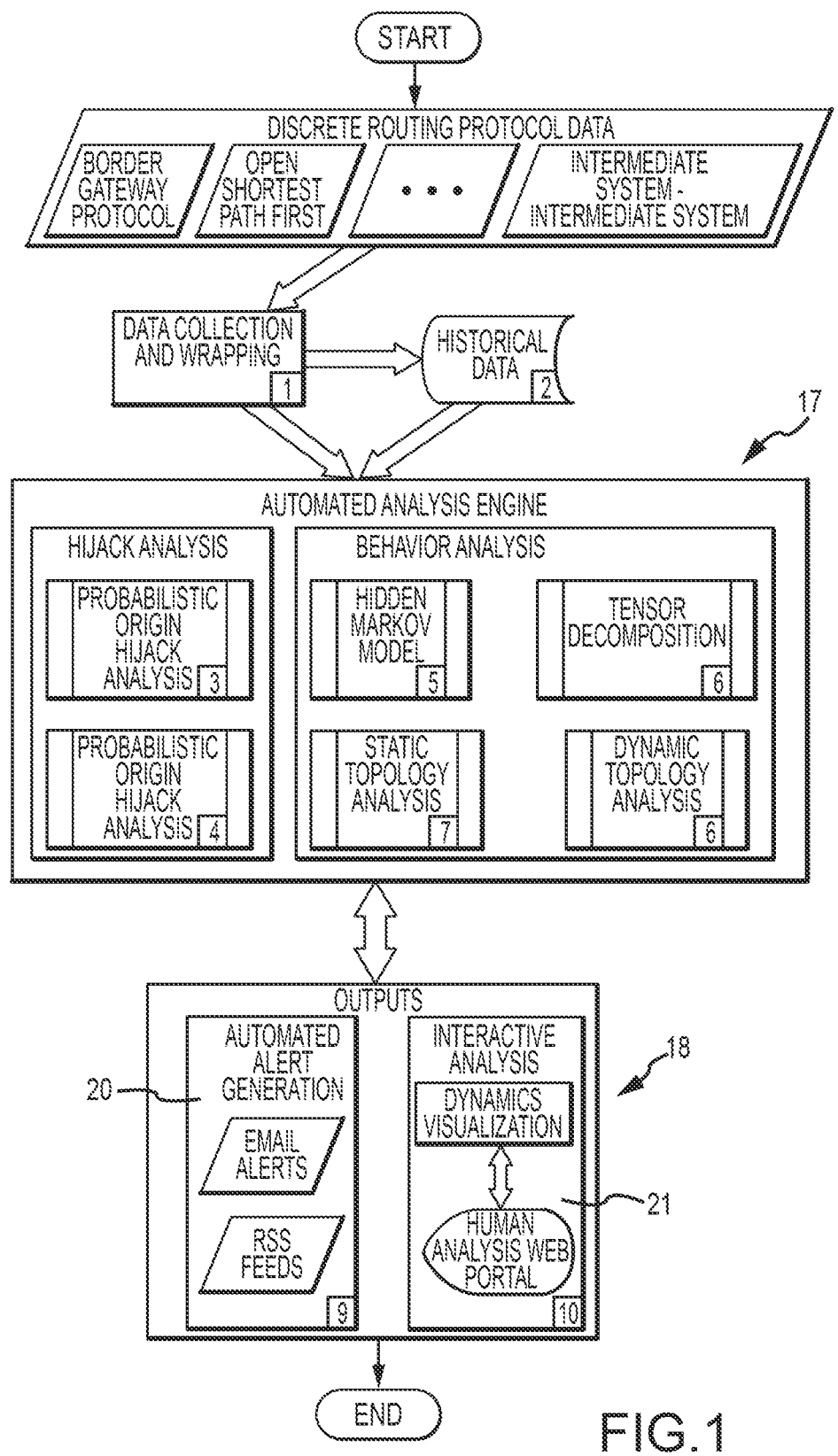
FIG. 1 is a flow chart illustrating the Internet Monitoring and Alerting System and method according to the present invention.
Figure 2:
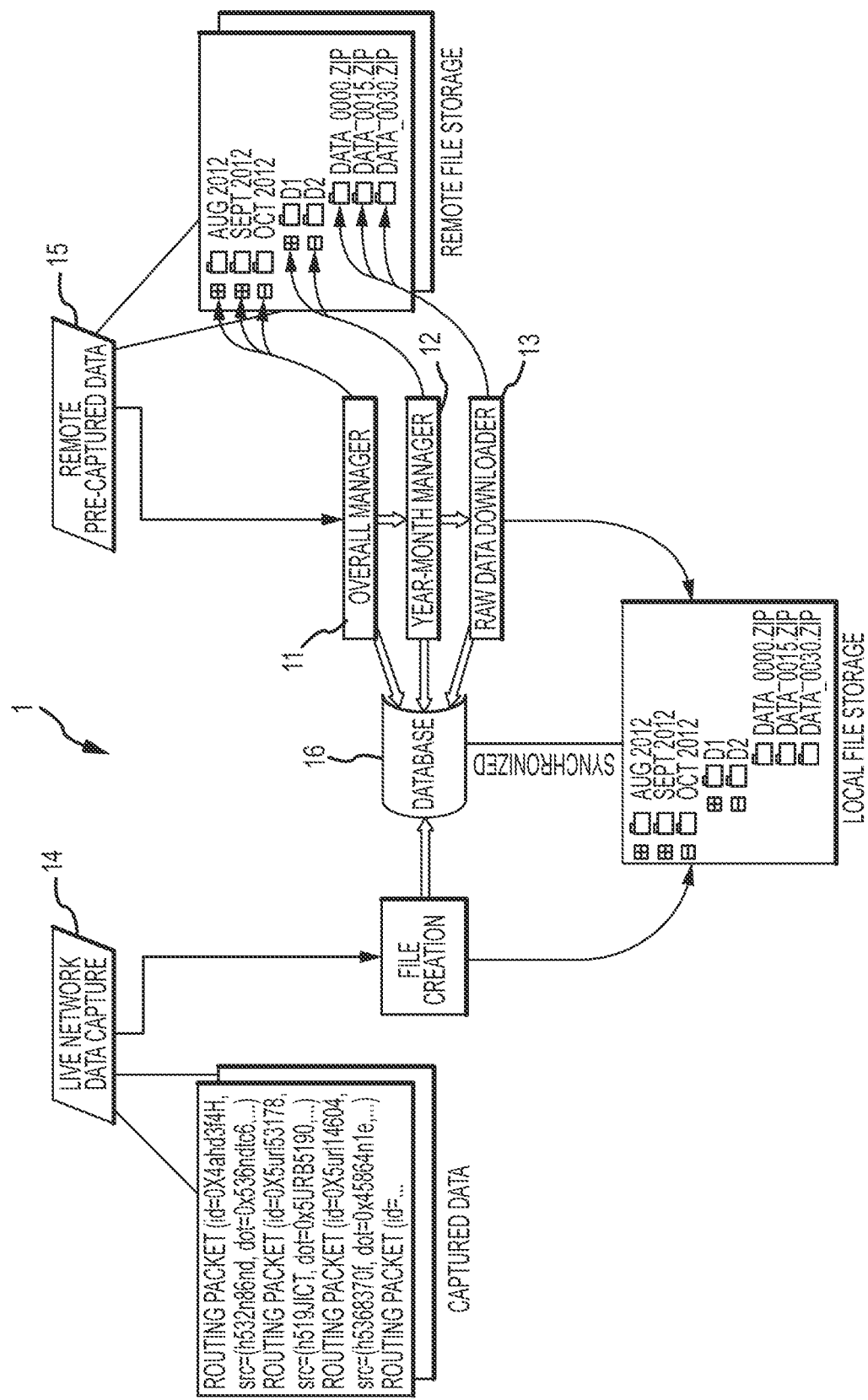
FIG. 2 shows a detail view of the data collection and wrapping module of FIG. 1.

Referring first to FIG. 1, which shows a flow diagram of the system, a data collection and wrapping module 1 represents a first component of the system. The data collection and wrapping module 1 is shown in detail in FIG. 2.

The system's input is a collection of messages produced by a network routing protocol on a network of interest, such as the Internet. This input can be collected from a live stream of such messages on a network 14, from historical dumps of such messages to a computer's file system 15, or a combination of both. The system according to the present invention allows usage of multiple sources in a configurable manner.

When collected from an external source, data is collected by sophisticated download management system, which is designed to operate with the directory structures of particular data sources and incorporates three types of execution threads: an Overall Manager 11, a Year-Month Manager 12, and a Raw File Downloader 13. These three types of threads 11, 12, 13 hierarchically proportion the task of constant data source monitoring, creating a two-tiered master/worker model. The data download process also tracks is own state and progress by maintaining information in a database 16. The Overall Manager 11 is responsible for monitoring the data source for the addition of new monthly data, making month entries in the database 16 and creating directories for the new data on the file system. It then delegates to the Year-Month Manager 12 thread to continue collection of new data.

The Year-Month Manager 12 monitors for new data files and performs similar tasks: making new database entries for individual data files and delegating to the Raw File Downloader 13 to retrieve the data file. It also is aware of its own life cycle and case monitoring for new data for a particular year and month when it is no longer meaningful to do so.

The Raw File Downloader 13 then retrieves the data filed (via Hypertext Transfer Protocol (HTTP) for example, or some other protocol), and will retry failed downloads for fault tolerance. It also reports its results, whether successful or not, by updating the relevant file's entry in the database 16.

If the messages are collected by live capture 14 on an operating network, they will be saved to disk in the same format as the data collected as above. This allows for easy use of historically collected data 2 (see FIG. 1), regardless of the original source.

Referring again to FIG. 1, as messages are collected, they are passed to the suite of analytics that make up the Automated Analysis Engine 17, which include a Probabilistic Origin Hijack Analysis 3; Probabilistic Route Hijack Analysis 4; Hidden Markov Model Analysis 5; Tensor Decomposition and Analysis 6; Static Topology Analysis 7; and Dynamic Topology Analysis 8.

Since all of the above analyses are driven directly from input data, they are all effectively real-time with respect to the speed of data collection. Furthermore, an independent instantiation of each analysis exists for each data source configured, and it maintains its own state, updating it with new data as it arrives from the appropriate source.

Figure 3:
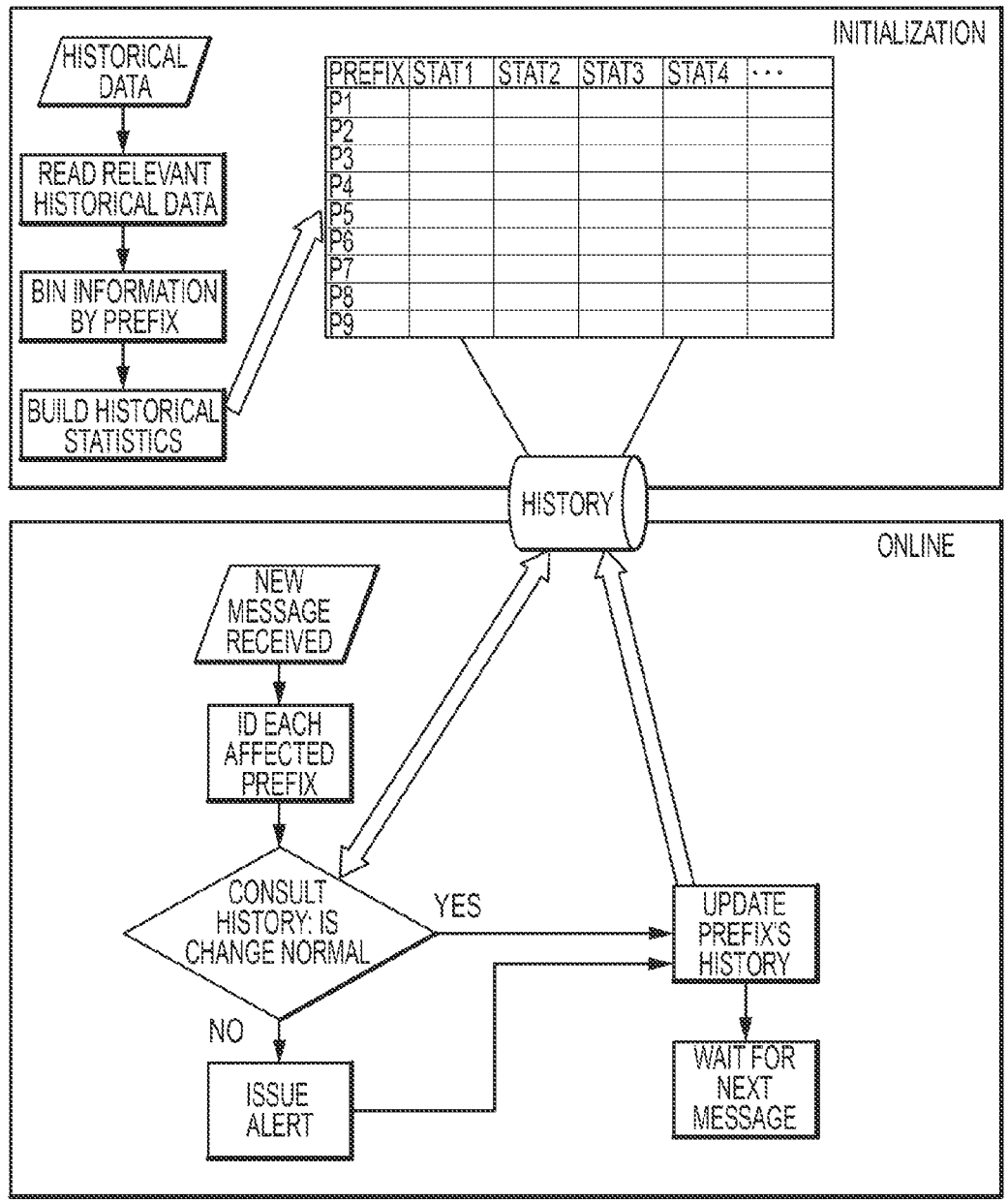
FIG. 3 shows a detail view of a probabilistic origin hijack analysis module of FIG. 1.

The Probabilistic Origin Hijack Analysis 3, shown in detail in FIG. 3, is responsible for detecting when unexpected change occur in the entity which claims to own a prefix, that is, a particular section of the Internet's address space. The system accomplishes this by retaining a recent history of routing information pertaining to each prefix. Initially historic information is used to profile the probability of each router in the Internet being the originator for each known prefix. These probabilities are then used to indicate the likelihood that an observed originator claim in the incoming data is valid. Furthermore, the incoming data is used to continually update the profiles of relevant prefixes, so that the system adapts over time.

The Probabilistic Route Hijack Analysis 4 operates in a similar manner, with the difference being that rather than being concerned with only the destination of a given route, the entire route itself is analyzed. The probabilities for each adjacent pair of nodes being seen in a route are calculated form historic information, establishing a probabilistic profile. Routes from incoming data are analyzed with respect to the collection of profiles to detect anomalies. As with Probabilistic Origin Hijack Analysis 3, the incoming data also updates the profiles over time.

According to the present invention, the Hidden Markov Analysis 5 uses the statistical modeling mechanism, Hidden Markov Models (HMMs), on timeseries information extracted from discrete routing protocols. The Internet Monitoring and Alerting System of the present application uses HMMS 5 as a means to observe the behaviors of the Internet as depicted by the routing data it takes as input.

One HMM application uses the incoming messages to detect when abnormal events are causing changes in the behavior of the internet. By crafting a model that is aware of the "bursty" nature of Internet traffic, the system avoids extraneous alerting of situations that actually occur normally in Internet-scaling routing. However, the state-space tracking capabilities of an HMM allow it to capture more subtle behaviors and be tuned to signal their presence.

A further HMM application is the classification of incoming messages by the stimuli that are likely to be affecting the Internet at the time. In this case, a suite of many HMMs is employed, with each instance tailored to recognize data feature that result from a particular type of stimulus. For example, one HMM may be tuned to disruptions from power outages, while another may be tuned to disruptions from hacker activity. Each HMM independently produces a numeric probability that a window of data (of a particular duration) matches the cause to which the HMM was tuned. By running this analysis continuously in time, always looking at the window of data leading up to the present moment, a real-time trend is produced. By comparing the independently-calculated rankings of the data from each HMM, the most likely stimulus of the system's current behaviors can be estimated.

Tensor Decomposition Analysis 6 provides two important pieces of information when applied to routing data: significant origins of routes and significant destinations of routes. The results provide the two end points in a topology of routes experiencing change. The utility of tensor decomposition varies with the method of constructing the tensors. They typically contain features observations from the input data, but are classified and separated by a varying number of dimensions, which may include such elements as timestamps, identities of the source or destination of routes, information about the prefix in question, and so on. The decomposition process selects the most impactive components from the data set under consideration, and thus, the choice of tensor dimensions allows for multiple applications of the analysis.

Because the system operates on messages from protocols that organize the topology of the Internet, it an reconstruct much of this topology for any point in time. This topology is mathematically represented as a graph with the addition of semantic information for each node and edge. Two types of graph-based analytics are used to accomplish the topology analysis: static analysis and dynamic analysis.

Static Topology Analysis 7 is accomplished by the application of several graph metrics to a topology snapshot at any given point in time. These metrics range from the traditional Dijkstra to the more modern Hubs and Authorities and K-shell algorithms. Some of the metrics used were designed for computer network analysis, and some are adapted to computer network analysis from graph analysis used in other fields. These metrics are useful in enhancing the results from Tensor Decomposition and Analysis 6 by nominating more nodes of interest from the graph.

Dynamic Topology Analysis 8 is accomplished by building change graphs, wherein the addition/removal of nodes and edges through time are tracked. Since these nodes and edges represent networked systems and their connectivity, changes in the graph correspond to changes in the network's topology.

The results of these analytics reach users of the system as user outputs 18 by two means: Automated Alerting 20 and an Internet Monitoring Portal 21 Automated Alerting 20 are driven in near-real time by the collection of input data. When a new message is received, each analytic tool updates its state, checks for change configured to trigger alerts, and sends alerts via email or Really Simple Syndication (RSS) feeds.

In some cases, an analytic tool will only be used to add supporting information to the alerts generated by other analytic tools. An end user can also explore analytic results actively through the Internet Monitoring Portal 21. The Internet Monitoring Portal 21 provides interactive analytic capabilities that utilize the historical data archived in the data warehouse to build visualization of Internet status.

In addition to the information available through the portal, alerts are automatically generated and distributed through email. These alerts contain information regarding: the severity of the disruptive event; the metric of label model fit for the event type; Logical Localization information as to entity involved in the event; metrics to rank involved entities based on associated topology community; and links to relevant portal analysis pages that detail the event.

In practice, the process of the inventive system works as follows: data is ingested and has a set of features extracted. The data is warehoused to allow forensic analysis. These extracted features drive the analytic process engine. The analytic process engine is composed of various components and each component provides a different part of the information necessary to populate alerts. One output of the analytic process engine produces near real-time alerts. In addition to alerts, the data warehouses and analytic process also drives a web-based portal that allows human interaction with the information from the alerts as well as visualization of the data supporting human interpretation.

The specification incorporates by reference the disclosure of U.S. Provisional Application Ser. No. 61/547,861 filed Oct. 17, 2011.

The present invention is, of course, in no way restricted to the specific disclosure of the specification and drawings, but also encompasses any modifications within the scope of the appended claims.

What we claim is:

1. A monitoring and alerting system for detecting a disruptive event on the Internet, comprising microprocessor compromising: a data collection and wrapping module configured to process input data, said input data including a plurality of messages produced by a network routing protocol on a selected network, wherein said input data comprises a live stream of said messages on said network, historical dumps of said messages to a computer's file system, or both; an automated analysis engine, said automated analysis engine comprising a plurality of analysis modules configured to analyze routing information and selected Internet behaviors from said input data; and user output, wherein said user output includes automated alerts to said user and an interactive analysis module, wherein said plurality of analysis modules includes a probabilistic origin hijack analysis module configured to detect unexpected changes in a selected Internet prefix by retaining a recent history of routing information pertaining to each prefix; a probabilistic route hijack analysis module configured to analyze routing information from an entire route by calculating probabilities for adjacent pairs of nodes being seen in a route from historic information; a Hidden Markov Model analysis module configured to observe behaviors of the Internet as represented by routing data taken in as input; a tensor decomposition and analysis module and a static topology analysis module, each configured to apply a plurality of graphical metrics to a selected Internet topology; and a dynamic topology analysis module configured to form change graphs and to track characteristics representing changes in the Internet topology.

2. The system according to claim 1, further comprising a download management system configured to operate with directory structures of selected data sources.

3. The system according to claim 2, wherein said download management system comprises a plurality of execution threads.

4. The system according to claim 3, wherein said plurality of execution threads includes an overall manager thread, a year-month manager thread, and a raw file downloading thread, wherein said overall manager thread is configured to monitor a data source of addition of new monthly data, make month entries in a database, a create directories for new data, and delegate to said year-month manager thread continuation of collection of new data, wherein said year-month manager is configured to monitor for new data files, make new database entries for individual data files, and delegate to said raw file downloading thread retrieval from one of said data file, and wherein the raw file downloader thread is configured to retrieve the data file, retry failed downloads, and report results by updating a selected file entry in said database.

5. The system according to claim 1, wherein the automated alerts include information regarding a time, a classification, and a location of the disruptive event.

6. The system according to claim 1, wherein said alerts are automatically generated and distributed through email.

7. The system according to claim 1, wherein said alerts include information regarding severity of the disruptive event; the metric of label model fit for a type of the event; Logical Localization information as to an entity involved in the event; metrics to rank involved entities based on associated topology community; and links to relevant portal analysis pages that detail the event.

8. The system according to claim 1, wherein the alerts are produced in near real-time.

9. A method for monitoring the Internet for disruptive events and alerting a user as to the disruptive events, comprising microprocessor comprising, the steps of: providing a data collection and wrapping module; processing with said data collection and wrapping module input data, said input data including a plurality of messages produced by a network routing protocol on a selected network, wherein said input data comprises a live stream of said messages on said network, historical dumps of said message to a computer's file system, or both; providing an automated analysis engine, said automated analysis engine comprising a plurality of analysis modules; analyzing routing information and selected Internet behaviors from said input data with said automated analysis engine; and generating user output, wherein said user output includes automated alerts to said user and an interactive analysis module, wherein said plurality of analysis modules includes a probabilistic origin hijack analysis module configured to detect unexpected changes in a selected Internet prefix by retaining a recent history of routing information pertaining to each prefix; a probabilistic route hijack analysis module configured to analyze routing information from an entire route by calculating probabilities for adjacent pairs of nodes being seen in a route from historic information; a Hidden Markov Model analysis module configured to observe behaviors of the Internet as represented by routing data taken in as input; a tensor decomposition and analysis module and a static topology analysis module, each configured to apply a plurality of graphical metrics to a selected Internet topology; and a dynamic topology analysis module configured to form change graphs and to track characteristics representing changes in the Internet topology.

10. The system according to claim 9, further comprising providing a download management system configured to operate with directory structures of selected data sources.

11. The system according to claim 10, wherein said download management system comprises a plurality of execution threads.

12. The system according to claim 11, wherein said plurality of execution threads includes an overall manager thread, a year-month manager thread, and a raw file downloading thread, wherein said overall manager thread is configured to monitor a data source of addition of new monthly data, make month entries in a database, a create directories for new data, and delegate to said year-month manager thread continuation of collection of new data, wherein said year-month manager is configured to monitor for new data files, make new database entries for individual data files, and delegate to said raw file downloading thread retrieval from one of said data file, and wherein the raw file downloader thread is configured to retrieve the data file, retry failed downloads, and report results by updating a selected file entry in said database.

13. The system according to claim 9, wherein the automated alerts include information regarding a time, a classification, and a location of the disruptive event.

14. The system according to claim 9, wherein said alerts are automatically generated and distributed through email.

15. The system according to claim 9, wherein said alerts include information regarding severity of the disruptive event; the metric of label model fit for a type of the event; Logical Localization information as to an entity involved in the event; metrics to rank involved entities based on associated topology community; and links to relevant portal analysis pages that detail the event.

16. The system according to claim 9, further comprising producing the alerts in near real-time.

\* \* \* \* \*